United States Patent

Kobetz et al.

[11] 3,832,456
[45] Aug. 27, 1974

[54] PROCESS FOR THE MANUFACTURE OF BERYLLIUM HYDRIDE

[75] Inventors: Paul Kobetz, Baton Rouge; Roy J. Laran, Greenwell Springs, both of La.; Robert W. Johnson, Jr., Savannah, Ga.

[73] Assignee: Ethyl Corporation, New York, N.Y.

[22] Filed: Oct. 18, 1962

[21] Appl. No.: 232,662

[52] U.S. Cl. .............................................. 423/645
[51] Int. Cl. ............................................ C01b 6/00
[58] Field of Search ................................... 23/204

Primary Examiner—Leland A. Sebastian
Assistant Examiner—R. L. Tate
Attorney, Agent, or Firm—Donald L. Johnson; John F. Sieberth; Lewis Hess

EXEMPLARY CLAIM

1. A process for the preparation of beryllium hydride which comprises reacting (1) a dialkyl aluminum hydride whereof each alkyl group contains not more than about eight carbon atoms, said dialkyl aluminum hydride containing more than 30 mole percent of a trialkyl aluminum, with (2) a compound selected from the group consisting of (a) beryllium halides in which the halogen has an atomic number from 17 to 53, (b) beryllium halide etherates of the general formula $$BeX_2 \cdot nR'_2O$$

wherein X is halogen of atomic number from 17 to 53, $n$ is 1 to 2, inclusive, and R' is an alkyl radical containing from one to eight carbon atoms, and (c) beryllium alkoxides of the general formula $$Be(OR')_2$$

the reaction mixture containing at least one mole of $R'_2O$ per mole of trialkyl aluminum in the alkyl aluminum hydride-trialkyl aluminum mixture present in the reaction mixture and recovering beryllium hydride from the reaction product.

18 Claims, No Drawings

PROCESS FOR THE MANUFACTURE OF BERYLLIUM HYDRIDE

This invention relates to a novel process for the manufacture of beryllium hydride.

Heretofore, attempts have been made to prepare beryllium hydride by the reaction of such dialkyl aluminum hydrides as diisobutyl aluminum hydride and diethyl aluminum hydride with beryllium chloride in solution in toluene or other hydrocarbons. These attempts were uniformly unsuccessful, no product being obtained because of the impurity of the reactants, specifically that of the dialkyl aluminum hydride. This is unfortunate because the successful production of beryllium hydride from such reactants would be a convenient, relatively economical process.

The cause of the failure to achieve success with the foregoing method has now been shown to be the formation of a complex, soluble in the solvent used, between the trialkyl aluminum impurity and the beryllium hydride product. This solubilization of the hydride made it difficult, if not impossible, to obtain the desired products in a pure state.

Accordingly, it is an object of this invention to provide a novel and effective method for the preparation of beryllium hydride from beryllium halide or alkoxide and dialkyl aluminum hydride containing large amounts of trialkyl aluminum impurity. Another object is to provide a novel and effective method for the preparation of beryllium hydride from the above raw materials in high yield and purity. A further object is to provide a method for the preparation of this compound which is not subject to the shortcomings of previous methods. These and other important objects of this invention will become apparent hereinafter.

It has now been found that a dialkyl aluminum hydride containing a large amount (more than 30 mole percent) of trialkyl aluminum impurity can be caused to react with a beryllium halide or with a beryllium alkoxide in the presence of an excess of an ether to produce beryllium hydride. It appears that the excess of ether forms an etherate complex with the trialkyl aluminum impurity, thus, in effect, removing the trialkyl aluminum from the reaction mixture, preventing it from forming a soluble complex with the beryllium hydride product and permitting the precipitation of the uncomplexed insoluble beryllium hydride product from the reaction solution.

In this reaction enough ether should be present in the reaction system to convert to the mono etherate complex all the trialkyl aluminum present in the starting mixture. The amount of ether required to form a complex with all of the trialkyl aluminum present is about one mole of ether per mole of trialkyl aluminum present. Therefore, the amount of ether present in the reaction zone ranges upwards from one mole to 50, 100, or more moles per mole of trialkyl aluminum present in the system.

It will be seen, therefore, that a distinct advantage of this invention is that it enables the use of commercially available dialkyl aluminum hydrides which contain significant quantities of trialkyl aluminum as a co-ingredient. This in turn simplifies the process, eliminates the need for a preliminary purification of the dialkyl aluminum hydride reactant, and reduces the costs associated with the production of the beryllium hydride. For example, this invention permits the preparation of beryllium hydride in high yield and purity from a commercially available mixture of about 25 to 35 percent of diethyl aluminum hydride with about 75 to 65 percent of triethyl aluminum which preparation has not hitherto been feasible.

The ethers of this invention include symmetrical and unsymmetrical alkyl ethers each of whose alkyl groups contains from 1 to 8 or more carbon atoms. Illustrative of these ethers are dimethyl ether, methyl ethyl ether, methyl n-propyl ether, diethyl ether, ethyl isobutyl ether, diisopropyl ether, di-n-butyl ether, di-tert-butyl ether, diisoamyl ether, bis(2-ethyl hexyl)ether, di-n-octyl ether, and mixtures thereof. Of these, diethyl ether is preferred because of its availability and economy.

The beryllium reactants of this invention include the halides, the halide etherates and the alkoxides. Illustrative of the halides are beryllium chloride, beryllium bromide, beryllium iodide, and mixtures thereof. Of the beryllium halides, the chloride and bromide are the cheapest and most readily available and their use therefore constitutes a preferred embodiment of this invention. Typical etherates include beryllium chloride diethyl etherate, beryllium chloride dimethyl etherate, beryllium bromide di-n-butyl etherate, beryllium iodide diisobutyl etherate, beryllium bromide di-n-hexyl etherate, beryllium iodide di-n-heptyl etherate, beryllium bromide diisooctyl etherate, and mixtures thereof. Examples of suitable alkoxide reactants include beryllium dimethoxide, beryllium diethoxide, beryllium diisopropoxide, beryllium di-tert-butoxide, beryllium di-n-hexoxide, beryllium diisooctoxide, and mixtures thereof.

Illustrative of the dialkyl aluminum hydride reactants are dimethyl aluminum hydride, diethyl aluminum hydride, di-n-propyl aluminum hydride, diisobutyl aluminum hydride, diisoamyl aluminum hydride, di(2-ethyl hexyl)aluminum hydride, diisooctyl aluminum hydride, and mixtures of these hydrides.

The reaction system, besides containing the above reactants, may contain diluents such as aromatic hydrocarbons. Suitable aromatic hydrocarbons are benzene, toluene, ortho-, meta- and para-xylenes, cumene, mesitylene, ortho-, meta- and para-cymenes, hemimellitene, pseudocumene, ethyl benzene, and mixtures thereof. Of these, toluene is preferred because of its cheapness and availability.

The invention will be more fully understood by reference to the following illustrative examples in which all parts and percentages are by weight.

EXAMPLE I 23.4 Parts of 75 percent diethyl aluminum hydride (containing 25 percent of triethyl aluminum) and 20.8 parts of beryllium chloride bis-diethyl etherate were covered with 500 parts of toluene and the solution was heated to 110°C. for a period of about 1½ hours. The product, a light white powder, was heated in the dry box using a magnetic stirrer to powder the solids, then removed to the high vacuum rack and heated to a maximum temperature of 140° to 145°C. over a period of 2 to 3 hours.

A sample of the product was heated from 150°C. to a maximum of 180°C. over a period of 1 to 2 hours. Analysis by gas evolution indicated that 73.5 percent of beryllium hydride was present in the product.

EXAMPLE II 6.4 Parts of diethyl aluminum hydride were reacted with 8.5 parts of anhydrous beryllium chloride in 50 parts of toluene under reflux. After the reflux had continued for approximately 1 hour, 50 parts of diethyl ether were introduced. After stirring, the product was filtered, washed and dried and yielded beryllium hydride of 46 percent purity as determined by analysis.

When the beryllium chloride is replaced with an equivalent amount of beryllium bromide or beryllium iodide, similar results are obtained. Likewise, when diethyl ether is used as the sole solvent with the application of pressure to raise the boiling point thereof or when the diethyl aluminum hydride is replaced by diisobutyl aluminum hydride, similar results are obtained.

EXAMPLE III 2.4 Parts of diethyl aluminum hydride were reacted with 2.9 parts of beryllium bromide diethyl etherate in 50 parts of toluene under reflux conditions. The product was isolated by filtration, washed thoroughly and dried. Analysis indicated that the product was beryllium hydride of 71 percent purity.

When the beryllium bromide dietherate is replaced by beryllium chloride dietherate or beryllium iodide dietherate, similar results are obtained.

EXAMPLE IV 6.4 Parts of 95 percent diisobutyl aluminum hydride were reacted with 5.0 parts of beryllium chloride etherate in 50 parts of refluxing toluene for approximately 1 hour. The product was isolated by filtration, washed and dried. Analysis indicated beryllium hydride of 67 percent purity.

When the toluene in the above example is replaced by diethyl ether, with the application of pressure to raise the boiling point thereof, similar results are obtained.

Replacement of the toluene with benzene, o-xylene, cumene, or mesitylene also leads to similar results.

EXAMPLE V 10.0 Parts of 30 percent diethyl aluminum hydride (balance: triethyl aluminum) were reacted with 3.0 parts of beryllium chloride dietherate in the absence of solvent. Ether (50 parts) was introduced at the completion of the reaction to aid in working up the reaction mixture. The mixture was filtered, washed and dried. The product was beryllium hydride of 59 percent purity.

EXAMPLE VI 5.0 Parts of 30 percent diethyl aluminum hydride (balance: triethyl aluminum) were mixed with 3.2 parts of beryllium bromide diethyl etherate in the absence of a solvent. 50 Parts of diethyl ether were introduced as before, the reaction mixture was filtered and washed and the product isolated.

EXAMPLE VII

23 Parts of 75 percent diethyl aluminum hydride (containing 25 percent of triethyl aluminum) and 10 parts of beryllium ethoxide are reacted in a di-n-propyl ether (50 parts) under reflux. The product, after being filtered, thoroughly washed and dried, is beryllium hydride in good yield and purity.

A number of variations are permissible in carrying out the procedure of the above example. Thus, when the diethyl aluminum hydride is replaced by diisobutyl aluminum hydride, or when diethyl ether or toluene is used as a solvent, similar results are obtained.

The reactants of this invention are commercially available or are readily prepared.

The dialkyl aluminum hydride-trialkyl aluminum reactants are prepared commercially by the reaction of trialkyl aluminum with metallic aluminum and with hydrogen; the reaction product is difficult to separate into its components. The reaction is carried out in the presence of a catalyst consisting of an alkali metal aluminum alkyl hydride.

The preferred ratios of the reactants are approximately stoichiometric but the proportions can vary from a 100 percent or greater excess of the dialkyl aluminum hydride to a 100 percent or greater excess of the beryllium halide. As indicated above, a mixture of about 30 percent of diethyl aluminum hydride with about 70 percent of triethyl aluminum is commercially available and is suitable for use in the reaction of this invention. The reaction temperature can vary from 0°C. or below to the reflux temperature of the particular solvent employed or, in the absence of solvent, to the reflux temperature of the dialkyl aluminum hydride. The reactions are normally carried out under atmospheric pressure, but may, if desired, be carried out under increased pressure of hydrogen or other gas such as nitrogen, helium, neon, argon, krypton, or xenon, inert to both the reactants and the products.

The order of addition of the reactants may be varied to suit the requirements of the particular reaction. The reaction periods can vary from less than 5 minutes to more than 2 hours.

The purity of the product ranges in general from 40 to 80 percent by weight of beryllium hydride, the balance being aluminum alkyl or aluminum alkyl halide.

The beryllium hydride product is a useful intermediate in chemical reactions. For example, it may be treated with ethylene to produce beryllium alkyls whose chain length varies with the reaction conditions. Also it may be used as a catalyst for the polymerization of ethylene and other monomers.

We claim:

1. A process for the preparation of beryllium hydride which comprises reacting (1) a dialkyl aluminum hydride whereof each alkyl group contains not more than about eight carbon atoms, said dialkyl aluminum hydride containing more than 30 mole percent of a trialkyl aluminum, with (2) a compound selected from the group consisting of (a) beryllium halides in which the halogen has an atomic number from 17 to 53, (b) beryllium halide etherates of the general formula

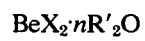

$$BeX_2 \cdot nR'_2O$$

wherein X is halogen of atomic number from 17 to 53, $n$ is 1 to 2, inclusive, and R' is an alkyl radical containing from one to eight carbon atoms, and (c) beryllium alkoxides of the general formula

$$Be(OR')_2$$

the reaction mixture containing at least one mole of $R'_2O$ per mole of trialkyl aluminum in the alkyl aluminum hydride-trialkyl aluminum mixture present in the reaction mixture and recovering beryllium hydride from the reaction product.

2. A process for the preparation of beryllium hydride which comprises reacting a dialkyl aluminum hydride whereof each alkyl group contains not more than about eight carbon atoms, said dialkyl aluminum hydride containing more than 30 mole percent of a trialkyl aluminum, with a beryllium halide in which the halogen has an atomic number from 17 to 53, the reaction mixture containing at least one mole of a dialkyl ether per mole of trialkyl aluminum in the alkyl aluminum hydride-trialkyl aluminum mixture present in the reaction mixture and recovering beryllium hydride from the reaction product.

3. A process for the preparation of beryllium hydride which comprises reacting a dialkyl aluminum hydride whereof each alkyl group contains not more than about eight carbon atoms, said dialkyl aluminum hydride containing more than 30 mole percent of a trialkyl aluminum, with a beryllium halide etherate of the general formula $$BeX_2 \cdot nR'_2O$$

wherein X is a halogen having an atomic number from 17 to 53, $n$ is 1 to 2, inclusive, and R' is an alkyl radical containing from one to eight carbon atoms and recovering beryllium hydride from the reaction product.

4. A process for the preparation of beryllium hydride which comprises reacting a dialkyl aluminum hydride whereof each alkyl group contains not more than about eight carbon atoms, said dialkyl aluminum hydride containing more than 30 mole percent of a trialkyl aluminum with a beryllium alkoxide of the general formula $$Be(OR')_2$$

wherein R' is an alkyl radical containing from one to eight carbon atoms, the reaction mixture containing at least one mole of $R'_2O$ per mole of trialkyl aluminum in the alkyl aluminum hydride-trialkyl aluminum mixture present in the reaction mixture and recovering beryllium hydride from the reaction product.

5. The process of claim 2 wherein the dialkyl aluminum hydride is diethyl aluminum hydride.

6. The process of claim 2 wherein the dialkyl aluminum hydride is diisobutyl aluminum hydride.

7. The process of claim 2 wherein the reaction is carried out in a mono nuclear aromatic hydrocarbon as a solvent.

8. The process of claim 2 wherein the beryllium halide is beryllium chloride.

9. The process of claim 2 wherein the beryllium halide is beryllium bromide.

10. The process of claim 3 wherein the dialkyl aluminum hydride is diethyl aluminum hydride.

11. The process of claim 3 wherein the dialkyl aluminum hydride is diisobutyl aluminum hydride.

12. The process of claim 3 wherein the reaction is carried out in a mono nuclear aromatic hydrocarbon as a solvent.

13. The process of claim 3 wherein the beryllium halide etherate is beryllium chloride bis-diethyl etherate.

14. The process of claim 3 wherein the beryllium halide etherate is beryllium bromide bis-diethyl etherate.

15. The process of claim 4 wherein the dialkyl aluminum hydride is diethyl aluminum hydride.

16. The process of claim 4 wherein the dialkyl aluminum hydride is diisobutyl aluminum hydride.

17. The process of claim 4 wherein the reaction is carried out in a mono nuclear aromatic hydrocarbon as a solvent.

18. The process of claim 4 wherein the beryllium alkoxide is beryllium ethoxide.

* * * * *

UNITED STATES PATENT OFFICE
CERTIFICATE OF CORRECTION

Patent No. 3,832,456          Dated August 27, 1974

Inventor(s) Paul Kobetz, Roy J. Laran, and Robert W. Johnson, Jr.

It is certified that error appears in the above-identified patent and that said Letters Patent are hereby corrected as shown below:

References cited has been omitted.

References Cited should read:  -- Barbaras et al., J. Am. Chem. Soc., Vol. 73, pp. 4585-4595 (1951) --.

Signed and sealed this 7th day of January 1975.

(SEAL)
Attest:

McCOY M. GIBSON JR.
Attesting Officer

C. MARSHALL DANN
Commissioner of Patents